July 24, 1962 S. B. TOBEY 3,045,308
FASTENER FOR PANELS AND COVERS
Filed April 25, 1960
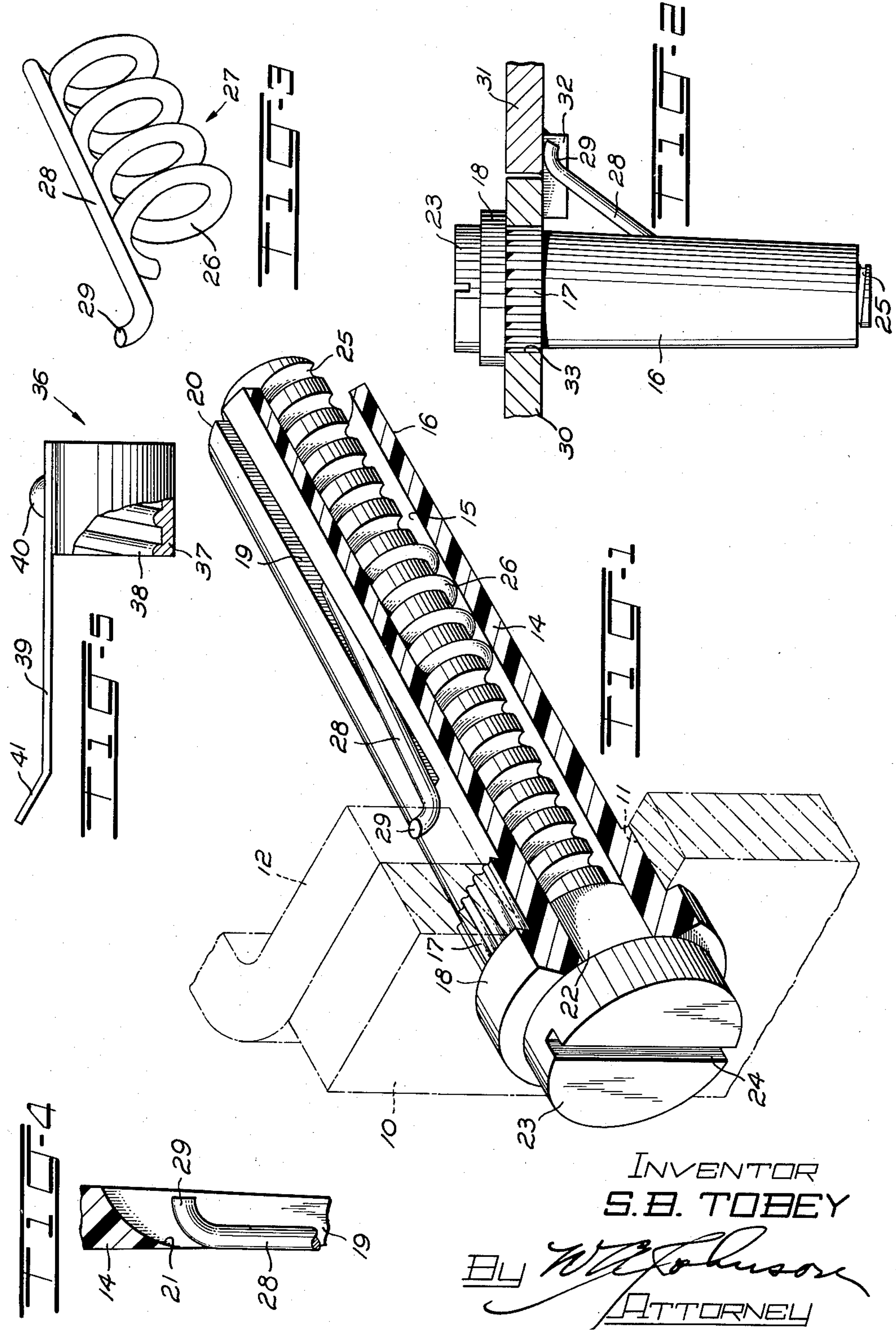

United States Patent Office 3,045,308
Patented July 24, 1962

1

3,045,308

FASTENER FOR PANELS AND COVERS

Silas B. Tobey, Westfield, N.J., assignor to Western Electric Company, Incorporated, New York, N.Y., a corporation of New York Filed Apr. 25, 1960, Ser. No. 24,445
4 Claims. (Cl. 24—211)

This invention relates to fasteners, particularly for securing panels, covers, or the like.

In various instances, particularly in the manufacture of telephone equipment, fasteners are desired for use in securing panels to frames, covers to housings, or doors to cabinets, to prevent accidental removal of these parts from their associated structures but to permit their removal by a suitable tool if it be so desired. Many fasteners of this type have been designed which, in most instances, are too costly to manufacture for this particular use.

The object of the present invention is a fastener for securing one member to another and the fastener being inexpensive to manufacture and highly efficient for the purpose intended.

According to the object, the invention includes a fastener for securing a first member, having an aperture therein to a second member, having an inner surface, comprising a hollow element receivable in the aperture and having a longitudinally extending slot therein to receive a resilient portion of a spiral third element moved longitudinally in the first element by a second element having a spiral groove therein, to move the resilient portion to force the outer end thereof into engagement with the surface of the second member, thereby securing the members together.

More specifically, the fastener is composed of three elements, the first or hollow element with its longitudinal slot terminating in a curved surface acting as a cam to force a rounded end of the resilient portion of the spiral third element outwardly, to form its connection with the second member, the second element of the fastener is rotatable in the first element having a spiral groove therein conforming to the convolutions of the spiral third element to cause it to move longitudinally of the first element to move into and out of fastening position.

Other objects and advantages will be apparent from the following detailed description when considered in conjunction with the accompanying drawing wherein:

FIG. 1 is an isometric view of the fixture, a portion thereof being broken away, showing the fastening of one member to another;

FIG. 2 is a top plan view of the fastener securing other members together;

FIG. 3 is an isometric view of the spiral element;

FIG. 4 is a fragmentary sectional view illustrating a portion of the slot in the first element; and FIG. 5 is a side elevational view of another species of the connecting or third element to replace, if desired, the spiral third element shown in FIG. 3.

The fastener shown in FIG. 1 is identical with that shown in FIG. 2, the only difference being that it is used to connect different members together. In FIG. 1, a first member or panel 10 having an aperture 11 therein is secured to a second member or frame 12. The fastener includes a first element 14 having a cylindrical inner surface 15 and, if desired, a slightly tapered outer surface 16. A portion 17 is serrated and of a diameter substantially equal or larger than the diameter of the aperture 11 so that the element 14 may be moved into the aperture and forced to position the portion 17 in the aperture and thereby hold the element against rotation or displacement with respect to the aperture. An enlarged portion 18 of the element 14 rests against the outer face of the first member 10. A longitudinal slot 19 is formed in the first element 14 and extends from the inner end 20 to a cam surface 21, the cam surface being of the contour shown in FIG. 4.

2

A second element 22 is rotatably disposed in the first element and has a head 23 normally resting against the head 18 and provided with a suitable tool receiving slot 24. The main portion of the second element 22 has a spiral groove 25 therein, the groove throughout its length being semi-circular in cross-section to receive spiral convolutions 26 of a third element indicated generally at 27.

In the present instance, the first element 14 and the second element 22 are molded of a suitable plastic material. The third element, as shown in FIG. 3, is made of a suitable resilient material such as spring steel having a cross-sectional contour which is round and of a size comparable to the cross-sectional contour of the spiral groove 25 to ride freely therein. A resilient portion 28 of the element 27 is located with respect to the turns or convolutions 26 so that it may ride in the slot 19 of the first element. Furthermore, the free end 29 of the portion 28 is rounded to lie in the slot during the normal assembly of the fastener and until the fastener is in an aperture of a first member to secure the first member 10 to the second member 12.

*Operation*

If the first member 10 is a panel, it will be provided with one or more of the fasteners at each end thereof to be secured to similar portions of a second member 12 or frame. To condition the panel for mounting, the fasteners, including the three elements, are mounted in each aperture 11 with the slot positioned to face the direction where the connection is to be made with the second member. For this reason, the illustration in FIG. 1 is somewhat misleading in that the slot 19, with the portion 28 of the third element 27, appears to be positioned at approximately a 45° angle instead of in a horizontal plane which is the preferred location for making connections of the type illustrated in FIG. 1. This is illustrated in FIG. 2 where a door or cover 30, representing the first member, is to be secured to a housing or cabinet 31 which is to be the second member, a stop 32 controlling the relative positions of the members when secured in place by the fastener.

In each instance, as illustrated in FIG. 1 or in FIG. 2, the fastener is located in the most desirable position either in the aperture 11 of the first member 10 or an aperture 33 of the first member 30 to locate the slot where it will direct the resilient member 28 to a surface of its respective second member.

When the fastener, in each instance, is in position and the panel 10 located and held temporarily adjacent the frame 12 and the cover 30 held in closed position adjacent its second member 31, the operator, by the aid of a suitable tool, may rotate the second element 22 to cause the third element to advance through the action of the spiral groove on the convolutions 26. This action moves the resilient member 28 longitudinally in the slot until it engages the cam surface 21, which is located a suitable distance short of the second member, to force the curved end 29 to move outwardly toward the inner surface of the second member and eventually engage the second member.

The resilient nature of the portion 28 of the third element 27 permits the operator to vary the holding effect of the fastener. By this, it is meant that rotation of the second element may be terminated the moment the curved end 29 of the resilient portion 28 engages the inner surface of the second member or the second member may be rotated further to advance the convolutions of the third element to increase step by step or movement by movement of the third element, the holding force of the portion 28 against the second member by further flexing the second member. This additional force, created in the third element or the portion 28 thereof, increases the effort which is necessary to unfasten the first member from the second member.

The species of the third element, indicated generally at 36 in FIG. 5, includes a cylindrical member having a spiral projection 38 adapted to interengage the spiral groove 25 to ride longitudinally of the second element during rotation thereof. A resilient member 39, fixed at 40 to the member 37, is positioned to ride in the slot 19 and has an outwardly bent free end 41 to engage the cam surface 21 and be moved outwardly thereby into engagement with the inner surface of the second member.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A fastener for securing a first member, having an aperture therein, to a second member, having an inner surface, comprising a non-rotatable hollow cylindrical element having a slot extending longitudinally thereof from an inner end and terminating short of an outer end of the element, a head fixed to the outer end of the hollow element to engage the first member when the hollow element is disposed in the aperture, a rotatable element disposed in the hollow element, having a head fixed to an outer end thereof to engage the head of the hollow element, and having a spiral groove formed in the rotatable element from an inner end thereof, an elongated resilient element having spiral turns formed in one portion thereof to ride in convolutions of the spiral groove and be moved longitudinally of the rotatable element by rotation of the rotatable element, and an arm portion extending through the slot and movable therein until a leading end thereof engages the inner surface of the second member.

2. A fastener according to claim 1 in which a cam portion is disposed at the terminus of the slot short of said outer end of the hollow element to be engaged by the arm portion of the elongated resilient element and flex the arm portion outwardly for engagement with the inner surface of the second member.

3. A fastener according to claim 1 in which a bend is formed in the leading end of the arm portion of the elongated element to engage the inner surface of the second member and move thereon as additional rotation of the rotatable element causes movement of the spiral turns of the resilient element to flex the arm with variable force against said surface.

4. A fastener according to claim 1 in which the hollow element is molded of a plastic material and the rotatable element is molded of a plastic material with the convolutions of the spiral groove partially conforming to the spiral turns of the elongated resilient element.

References Cited in the file of this patent

UNITED STATES PATENTS

| | | |
|---|---|---|
| 2,616,328 | Kingsmore | Nov. 4, 1952 |
| 2,950,141 | Koff | Aug. 23, 1960 |

FOREIGN PATENTS

| | | |
|---|---|---|
| 38,137 | Sweden | Jan. 7, 1915 |